United States Patent [19]
Nyman

[11] Patent Number: 5,245,477
[45] Date of Patent: Sep. 14, 1993

[54] MAGNIFIER

[76] Inventor: Morton Nyman, 4201 NW. 77th Ave., Miami, Fla. 33166

[21] Appl. No.: 960,813

[22] Filed: Oct. 14, 1992

[51] Int. Cl.⁵ .................................. G02B 7/02
[52] U.S. Cl. .................................. 359/818; 359/811
[58] Field of Search ............... 359/802, 803, 804, 805, 359/808, 809, 810, 811, 812, 815, 818

[56] References Cited

U.S. PATENT DOCUMENTS

| | | |
|---|---|---|
| 1,059,868 | 4/1913 | Harrison ..................... 359/805 |
| 2,718,815 | 9/1955 | Manning ..................... 359/818 |
| 2,746,346 | 5/1956 | Gaire ......................... 359/818 |
| 4,095,874 | 6/1978 | Wallace ...................... 359/804 |

Primary Examiner—Loha Ben
Attorney, Agent, or Firm—Peter T. Cobrin; Marvin S. Gittes; Richard I. Samuel

[57] ABSTRACT

A magnifying device that can be attached to a retail store shelf where a product on the shelf, such as a can, a medicine bottle, etc., can be placed beneath the magnifying glass of the magnifying device so that the small print contained on the label of the product can be read.

10 Claims, 4 Drawing Sheets

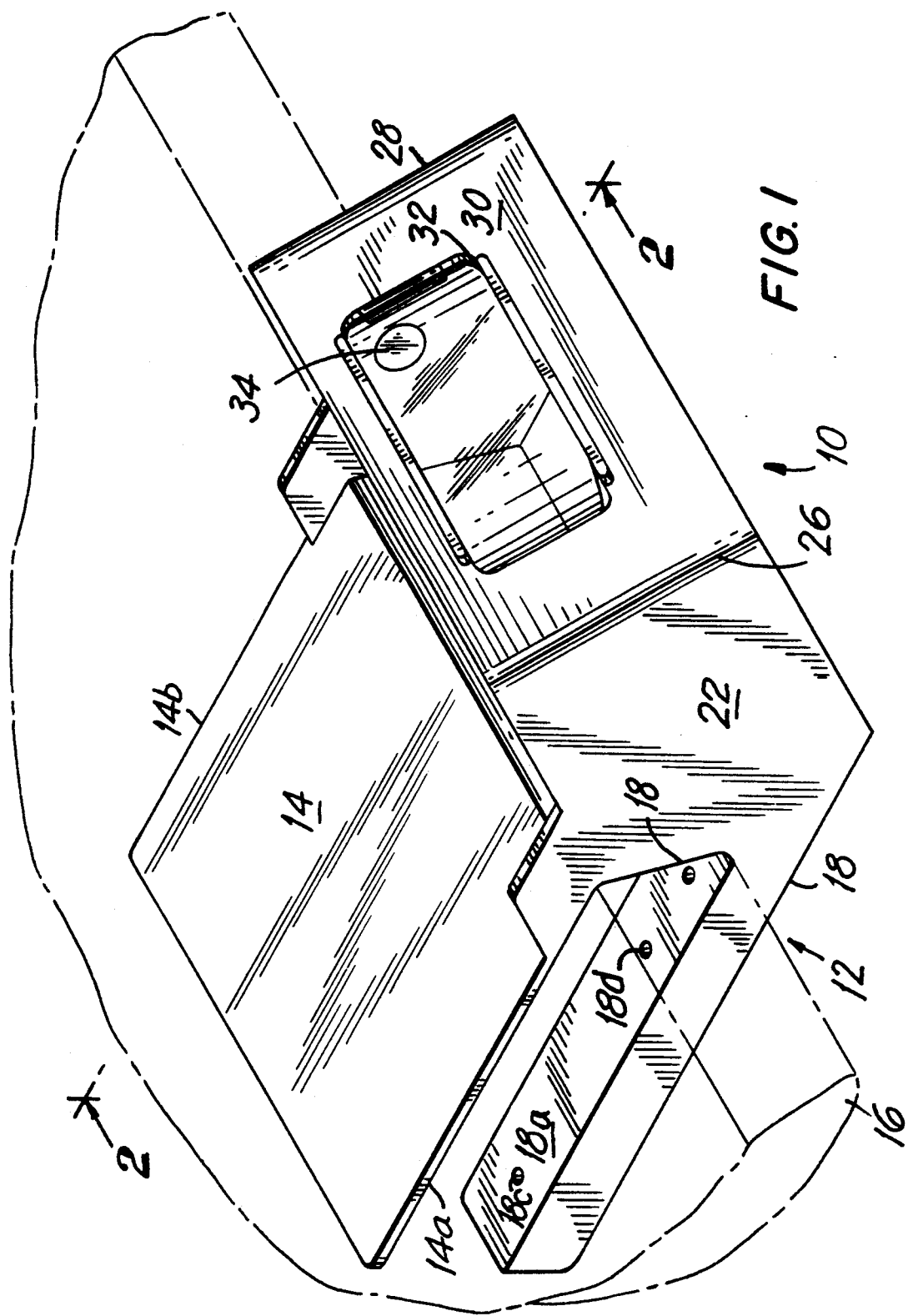

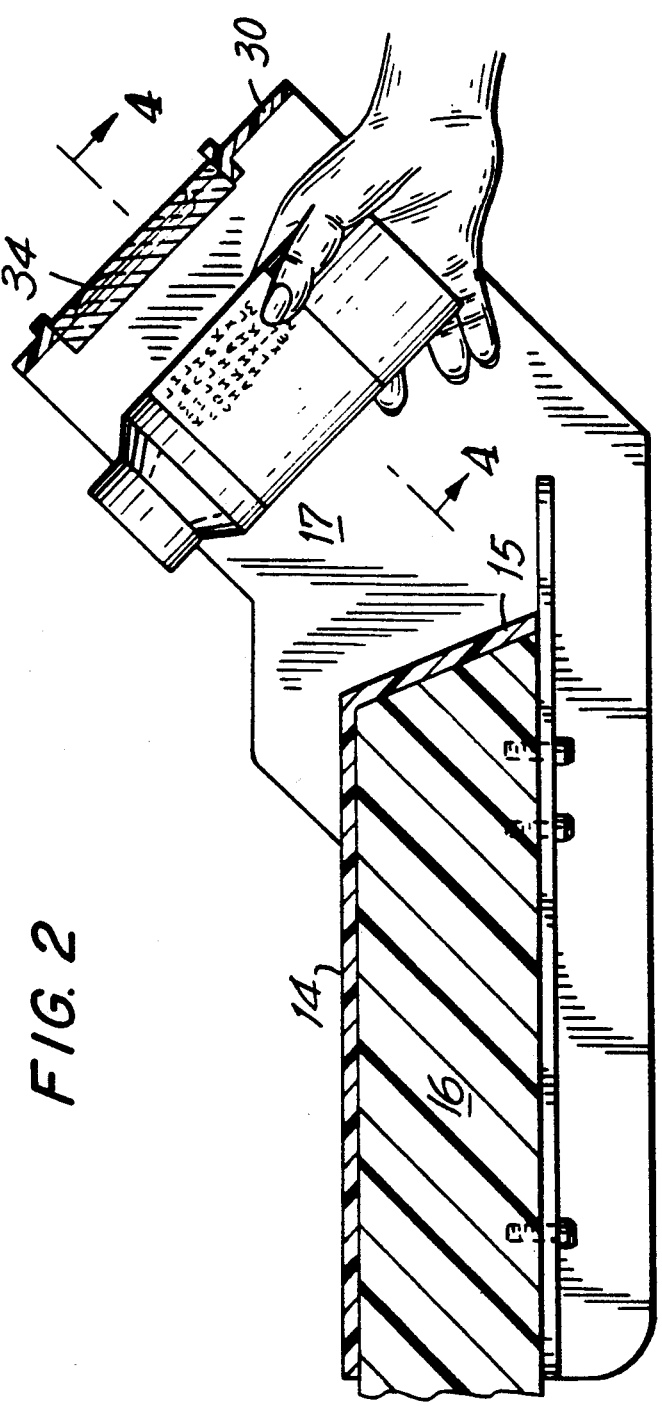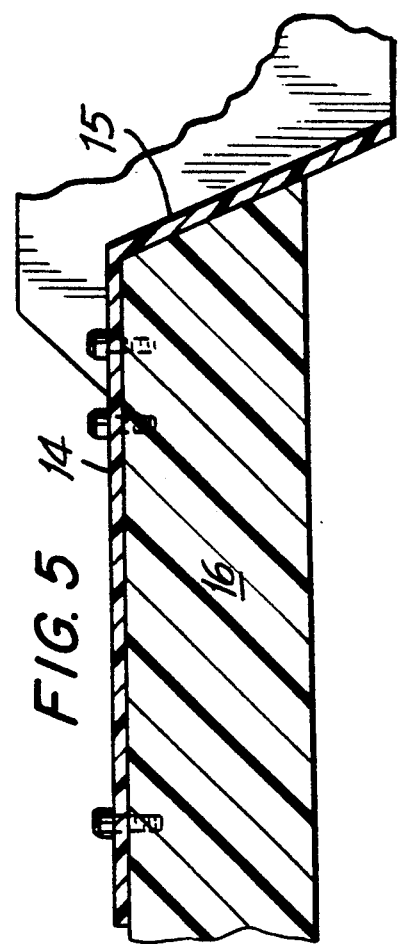

MAGNIFIER

FIELD OF THE INVENTION

This invention relates to a magnifying device that can be attached to a retail store shelf and, more specifically, wherein a product on the shelf, such as a can, a medicine bottle, etc. can be placed beneath a magnifying glass of the magnifying device so that the small print contained on the label on the product can be read without any difficulty by those persons who have limited capability in reading small print.

BACKGROUND OF THE INVENTION

In most retail establishments there are shelves upon which the various products the store is selling are displayed. These products may consist of canned or bottled foods as well as non-prescription pharmaceuticals. With many of these products, the label on the product, be it a label on the can or the label on a medicine bottle or the label on a glass food container, etc., can be quite small and, specifically, the ingredients contained in the container, while listed on the label, are difficult to read by those who have limited visual acuity. This is a particular problem with elderly persons since the ability to read fine print often deteriorates with advancing age.

It is of critical importance when a person is selecting an over-the-counter non-prescription pharmaceutical product contained in a relatively small plastic container, that (s)he be able to read the label so that the person can be satisfied that (s)he is purchasing the correct product. With small print on many of these pharmaceutical container labels this is simply not possible.

The problem also arises in supermarkets where people on restricted diets must be able to read the contents label on a food container to make sure that they are not buying food which contains ingredients that may be harmful to them. As an example, certain people should not eat foods that contain sugar and, thus, they must carefully review the labels on all food containers to make sure that the food within the container is sugar-free. Other persons may be allergic and/or have adverse reactions to other food ingredients and they, too, must read the container to make sure that it does not contain potentially dangerous ingredients. With many food products the ingredients, while listed on the label on the container, are difficult to ascertain because the print is relatively small.

It is not a satisfactory solution for those persons who have difficulty reading store product labels to ask store personnel to read the ingredients to them since this creates an undue burden on the store personnel and it might be embarrassing for those persons who have difficulty reading the product labels to have to ask someone to help them read the labels.

It is important that any magnifying device that is made available to store patrons for magnifying the ingredients on a product label be located in the vicinity of the area where a product is being offered for sale since patrons may not want to walk a great distance to be able to ascertain for themselves what the contents of the product are.

SUMMARY OF THE INVENTION

Objects of the Invention

It is therefore an object of the present invention to provide a magnifying device that can be used by the patrons of a retail establishment to magnify the labels on products such as cans, bottles, and pharmaceutical products, so that the contents thereof can be easily read by those who have difficulty in reading the printing on the product label.

Another object of the present invention is to provide a magnifying device that can be used by the patrons of a retail establishment to magnify the printing on a product label whereby the magnifying device can be easily attached to the store shelf and readily used by store patrons.

Yet another object of the present invention is to provide a magnifying device for a retail establishment that can be used by the patrons thereof to magnify the ingredients on a product label whereby the magnifying device can be shifted to various locations in the store.

A still further object of the present invention is to provide a magnifying device that can be used by the patrons of a retail establishment to magnify the labels and specifically the ingredients contained thereon so that the patron will be able to ascertain the ingredients of the product to which the label is attached whereby the magnifying device is constructed so as to be difficult to illicity remove from the store.

A further object of the present invention is to provide a magnifying device that is capable of achieving each of the foregoing objects and yet is relatively inexpensive in construction.

Other objects of the invention will be apparent to those having ordinary skill in the art to which the present invention pertains.

BRIEF DESCRIPTION OF THE INVENTION

The foregoing and other objects are achieved by a magnifying device which is adapted to be attached to a store shelf and includes side pieces which are parallel to each other and extend toward the base of the store shelf. Attached to the ends of the side pieces furthest from the store shelf is a magnifying support section in which a magnifying lens is located. If desired, the magnifying lens can include, in addition to a relatively large magnification lens, a small extra-power magnification lens and the magnifying lens is spaced from the store shelf and inclined with respect thereto so that in the space defined between the magnifying lens and the end of the store shelf a product can be placed behind the magnifying lens.

The product can then be positioned so that the ingredients section of the label is positioned behind the magnifying lens at an appropriate distance from the magnifying lens so that the store patron who looks through the magnifying lens will be able to clearly see the magnified print on the label which contains a description of the ingredients on the label.

BRIEF DESCRIPTION OF THE DRAWINGS

FIG. 1 of the drawings is a perspective view, partially broken away, looking down at the magnifying device of the present invention;

FIG. 2 is a sectional view taken substantially along the line 2—2 of FIG. 1 of the drawings and illustrates a person utilizing the magnifying device of the present invention;

FIG. 5 is a sectional view of an alternate embodiment of the present invention.

DESCRIPTION OF THE PREFERRED EMBODIMENTS

Figure 3:
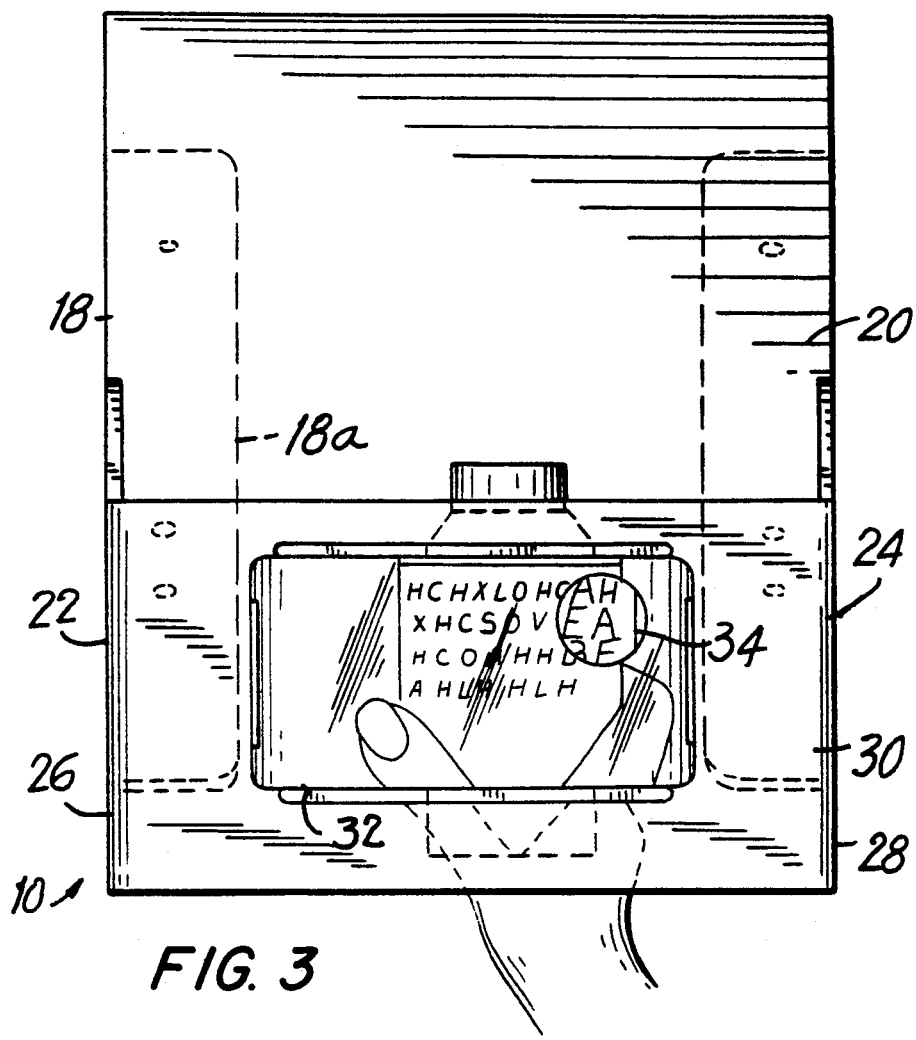
FIG. 3 is a front plan view of the magnifying device of the present invention.

In the drawings, a magnifying device 10 according to the present invention is shown, and as can be seen in FIG. 1, includes a shelf clamp 12. Shelf clamp 12 includes a shelf plate 14 which is adapted to be placed on the top of a retail store shelf 16 and shelf fingers 18 and 20 extend beneath the store shelf. Fingers 18 and 20 are generally parallel to shelf plate 14 and the distance between the upper edge of fingers 18 and 20 and shelf plate 14 conforms to the height of store shelf 16.

Magnifying device 10 includes side pieces 22 and 24, which side pieces are generally parallel to each other. Extending from the top portion of side pieces 22 and 24 is shelf plate 14 and extending from the bottom portion of side pieces 22 and 24 are shelf fingers 18 and 20. Extending across edge 26 of side piece 22 and edge 28 of side piece 24 is a front piece 30. Side pieces 22 and 24 at their portions adjacent edges 26 and 28, respectively, extend outwardly and upwardly away from shelf plate 14 such that front piece 30 is inclined relative to shelf plate 14 and there is a space 17 defined between abutment piece 15 which depends downwardly from the forward edge of shelf plate 14 and front piece 30.

This space, best seen in FIGS. 2, 3 and 4, must be of sufficient size so that a product, such as a bottle or a can, can be placed therein and manipulated as will hereinafter be described. It is noted that while front piece 30 and abutment piece 15 are shown as being generally parallel to each other, this is not a requirement of the present invention.

Figure 6:
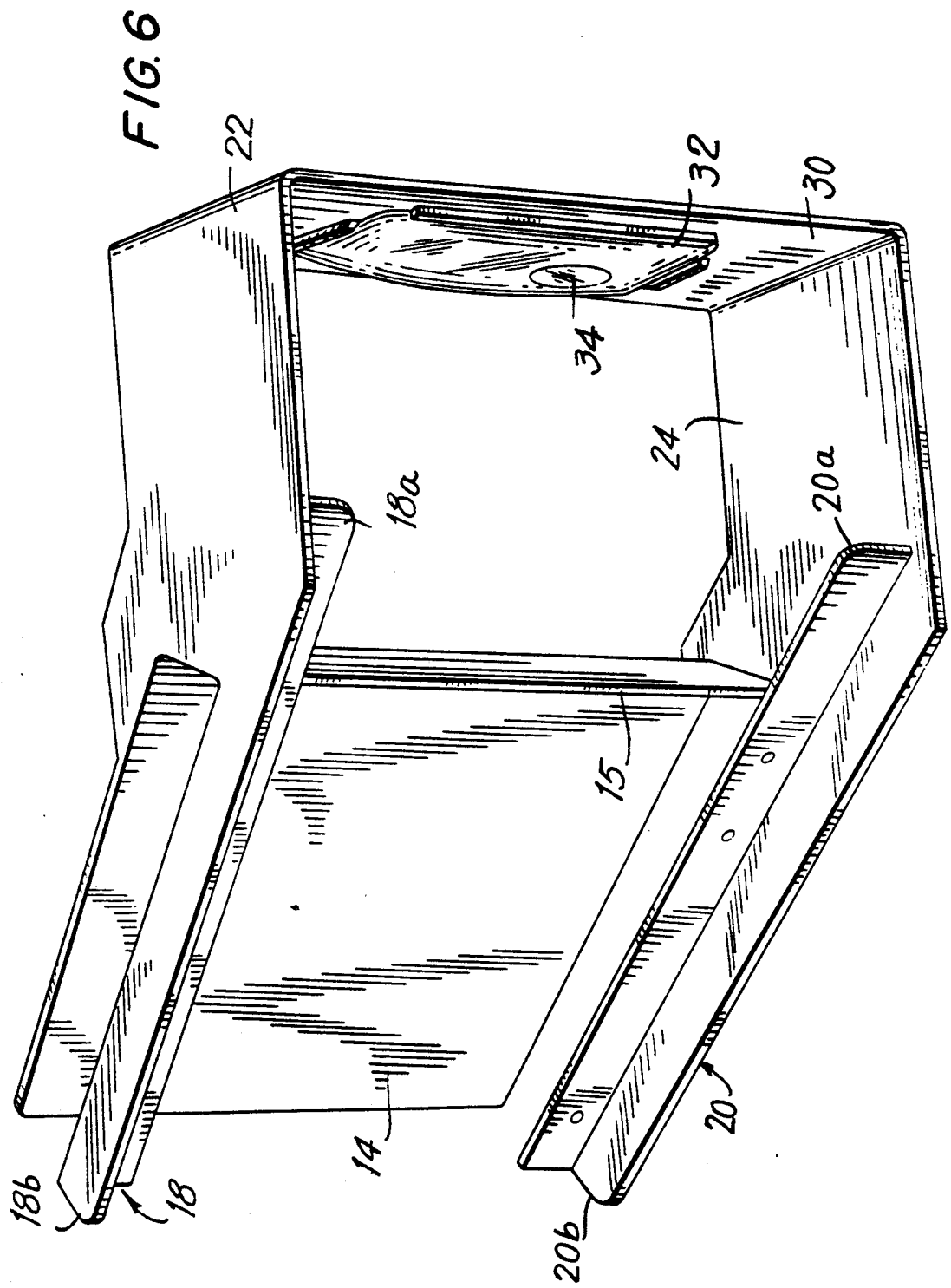
FIG. 6 is a perspective view of the bottom part of the magnifying device of the present invention.

Shelf finger 18 includes a bottom piece 18a which is parallel to shelf plate 14 and a side piece 18b which is perpendicular to bottom piece 18a. Bottom piece 18a extends past abutment piece 15 and screw holes extend through finger 18, three of which are seen in FIG. 6, for a purpose that will hereinafter be described. Identical structure is associated with finger 20 and identical parts in fingers 18 and 20 have the same alphabetical designation.

Located on front piece 30 is a magnifying glass 32 which is generally rectangularly shaped, although the particular shape of magnifying glass 32 can be varied as desired. The particular magnifying power of magnifying glass 32 can be selected so that when a product is positioned in space 17 and its label positioned facing magnifying lens 32 a typical person will be able to look through the magnifying lens and read the product contents listed on the label without difficulty. For those persons who require extra assistance in reading label print an additional small extra-power magnifying lens 34 is located on magnifier 32 and, while shown as circular in configuration, can have any desired geometric shape. Generally, extra-strength magnifying lens 34 will have a greater magnifying power that lens 32 and is selected so that when a product label is positioned behind lens 34 those persons with minimal visual acuity will be able to see the label contents when viewing the same through lens 34.

In use, magnifying device 10 will be positioned so that shelf plate 14 rests on the top of store shelf 16 and fingers 18 and 20 abut against the undersurface of the store self. More specifically, the top surface of bottom pieces 18a and 20a will abut against the bottom surface of store shelf 16 and abutment surface 15 will abut against the forward edge of the store shelf. Screws can extend through screw holes 18c, 18d and 18e on bottom piece 18a, as shown in FIG. 2, into store shelf 16 to secure the magnifying device to the store shelf making pilferage difficult. In a similar fashion, screws can extend through corresponding screw holes in bottom piece 20a of finger 20. In this fashion, the magnifying device will be secured to a store shelf. Alternatively, the use of screws can be eliminated.

Product can be displayed on store shelf 16 and can rest on shelf plate 14, thereby not precluding the use of any portion of the store shelf for product display.

Figure 4:
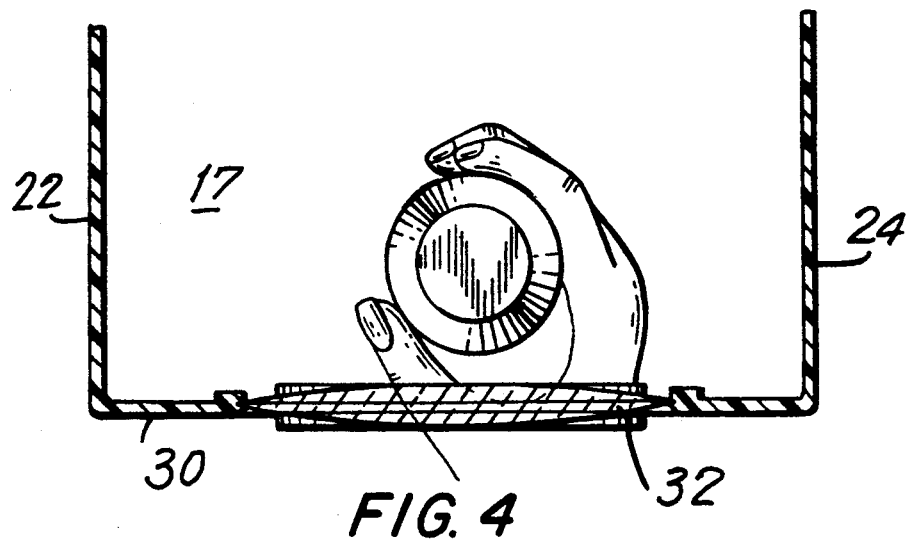
FIG. 4 is a sectional view taken substantially along the line 4—4 of FIG. 2.

When a person selects a product and has trouble reading the contents contained on the label thereof, the product will be positioned in space 17, as shown in FIGS. 2, 3 and 4 and manipulated until the label contents print is beneath front piece 30. The person will then look through magnifier 32 at the print and, because of the enhanced magnification of the print by reason of magnifier 32, be able to read the print. If additional magnification is required, the product label will be placed beneath extra-power magnification lens 34 so that for those persons who require the greatest amount of assistance in reading product label print, they will be able to read the product label print.

In the embodiment of the invention shown in FIG. 5, there are no fingers 18 and 20 as are shown in the rest of the figures. The magnifying device 10 of FIG. 5 is secured to store shelf 16 by threading screws into the store shelf 16 through screw holes that are spaced throughout shelf plate 14 and preferably along edges 14a and 14b thereof.

The products whose labels are magnified using the magnifying device of the present invention will normally be on store shelf 16 in the immediate vicinity of the magnifying device and plurality of such magnifying devices can be attached to a particular store shelf at spaced intervals so that store patrons will not have to walk a significant distance in order to be able to magnify the product contents portion of a product label. However, the particular distance between the magnifying device for a particular store shelf will vary as the required.

While this invention has been shown and described in connection with particular preferred embodiments, various alterations and modifications will occur to those skilled in the art. Accordingly, the following claims are intended to define the valid scope of this invention over the prior art, and to cover all changes and modifications falling within the true spirit and valid scope of this invention.

What is claimed is:

1. A device for magnifying the contents section of a product label that is displayed on a store shelf comprising:
   (a) a magnifying lens;
   (b) means for selectively securing the magnifying lens relative to a store shelf with a space between the magnifying lens and the edge of the store shelf whereby a product can be placed in the space so that a store patron by appropriately positioning the product in the space can view the contents section on the product label through the magnifying lens;
   (c) said selective securing means including a first section adapted to be placed on the top of a store shelf and a second section adapted to be placed adjacent the bottom of the store shelf; and (d) the distance between the first and second sections being approximately the height of the store shelf.

2. A device for magnifying the contents section of a product label that is displayed on a store shelf according to claim 1, wherein said selective securing means includes means for maintaining the magnifying lens at an incline with respect to the store shelf.

3. A device for magnifying the contents section of a product label that is displayed on a store shelf according to claim 2, wherein said maintaining means includes a first side piece and a second side piece, said first and second side pieces extending upwardly and outwardly away from said first section and said second section, and means secured to said side pieces for supporting said magnifying lens.

4. A device for magnifying the contents section of a product label that is displayed on a store shelf according to claim 3, wherein said means for securing said magnifying lens includes a front piece, said magnifying lens being supported in said front piece, and a further extra-power magnifying lens being located in said magnifying lens.

5. A device for magnifying the contents section of a product label that is displayed on a store shelf according to claim 1, wherein said first section includes a shelf plate adapted to abut the upper surface of the store shelf.

6. A device for magnifying the contents section of a product label that is displayed on a store shelf according to claim 5, wherein said second section includes two spaced apart, parallel fingers.

7. A device for magnifying the contents section of a product label that is displayed on a store shelf according to claim 6, wherein the second section includes two spaced apart fingers with each finger having a flat surface adapted to be placed against the bottom of the store shelf.

8. A device for magnifying the contents section of a product label that is displayed on a store shelf according to claim 1 and further including an abutment surface extending between said first and second sections and adapted to abut the free edge of the store shelf.

9. A device for magnifying the contents section of a product label that is displayed on a store shelf according to claim 1, wherein said first section includes a flat plate adapted to be placed against the upper surface of the store shelf wherein product can be placed on said upper surface.

10. A device for magnifying the contents section of a product label that is displayed on a store shelf comprising:

(a) a shelf;

(b) a magnifying lens;

(c) means for selectively securing the magnifying lens at an incline relative to the store shelf with a space between the magnifying lens and the edge of the store shelf whereby a product can be positioned in said space so that a store patron, by appropriately positioning the product in the space, can view the contents section of the product label through the magnifying lens, said selective securing means including a section resting on the upper surface of the shelf; and (d) means for securing said section to the upper surface of said store shelf.

* * * * *